(12) United States Patent
Liao

(10) Patent No.: US 7,887,362 B2
(45) Date of Patent: Feb. 15, 2011

(54) SUPPORTING DEVICE OF A SOCKET

(76) Inventor: Sheng-Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 11 days.

(21) Appl. No.: 12/379,630

(22) Filed: Feb. 26, 2009

(65) Prior Publication Data

US 2009/0163073 A1 Jun. 25, 2009

Related U.S. Application Data

(62) Division of application No. 11/777,597, filed on Jul. 13, 2007, now Pat. No. 7,682,185.

(51) Int. Cl.
H01R 13/72 (2006.01)
(52) U.S. Cl. .................... 439/501; 439/532
(58) Field of Classification Search ........... 439/501, 439/529, 532
See application file for complete search history.

(56) References Cited

U.S. PATENT DOCUMENTS

| | | | | |
|---|---|---|---|---|
| 3,088,054 A * | 4/1963 | Meyer | | 361/608 |
| 3,257,497 A * | 6/1966 | Chase | | 174/66 |
| 4,479,688 A * | 10/1984 | Jennings | | 200/43.02 |
| 4,742,429 A * | 5/1988 | Arrendiell et al. | | 361/727 |
| 6,926,554 B2 * | 8/2005 | Liow et al. | | 439/528 |
| 7,654,855 B2 * | 2/2010 | Liao | | 439/441 |
| 7,682,185 B2 * | 3/2010 | Liao | | 439/501 |
| 2009/0017676 A1 * | 1/2009 | Liao | | 439/529 |
| 2009/0047827 A1 * | 2/2009 | Liao | | 439/501 |
| 2009/0163073 A1 * | 6/2009 | Liao | | 439/527 |
| 2010/0075540 A1 * | 3/2010 | Liao | | 439/638 |

* cited by examiner

Primary Examiner—James Harvey
(74) Attorney, Agent, or Firm—Rosenberg, Klein & Lee

(57) ABSTRACT

A supporting device of a socket is located around a socket for supporting the electronic device and the transmission wire. When the plug located at the end of the transmission wire of the electronic device is plugged into the socket to connect with a power source or transmit data via the Internet, the supporting device of the present invention supports the electronic device to prevent the transmission wire and the plug from being pulled and dragged due to the electronic device being far away from the socket. The problem of the electronic device being damaged due to the electronic device being pulled and dragged is also overcome. The electronic device is protected and continues operating so that it can connect with a power source or transmit data via the Internet.

2 Claims, 13 Drawing Sheets

SUPPORTING DEVICE OF A SOCKET

RELATED APPLICATIONS

This application is a Divisional patent application of application Ser. No. 11/777,597, filed on 13 Jul. 2007 now U.S. Pat. No. 7,682,185. The entire disclosure of the prior application, Ser. No. 11/777,597, from which an oath or declaration is supplied, is considered a part of the disclosure of the accompanying Divisional application and is hereby incorporated by reference.

BACKGROUND OF THE INVENTION

1. Field of the Invention

The present invention relates to a supporting device of a socket. In particular, this invention relates to a supporting device that supports an electronic device and prevents the plug of the electronic device from falling off the socket when the electronic device is being charged or is transmitting data via the Internet. It protects the electronic device and ensures that the electronic device continues to be charged and operate.

2. Description of the Related Art

Electronic devices, such as cell phones, digital still cameras, PDAs, and portable electronic devices, need to be charged or connected with a socket to obtain their required electric power. Household electric power is most commonly used as such a power source.

The related devices for providing household electric power are usually embedded into the wall and a socket is used to connect with the power wire or the signal wire. When the power of the electronic device is exhausted and needs to connect with the. power wire to obtain power, or the electronic device is connected with the Internet to transmit information, the user plugs the plug of the electronic device into the socket to connect with the household electric power or signal wire for obtaining electric power or transmitting data.

However, the socket of the prior art has the following drawbacks:

1. In order to make the electronic device handy and easy for carrying around, electronic devices must be small and light. When the electronic device needs to be charged or connected with the Internet to transmit data, the expensive electronic device has to be placed on the ground that is adjacent to the socket because there is no supporting device around the socket. The plug located at the end of the transmission wire of the electronic device is plugged into the socket. When a person walks past the socket, the person may accidentally step on or crash into the socket thereby damaging the socket.

2. In order to overcome the problem of the electronic device being placed on the ground and damaged due to being stepped on or crashed into, the electronic device can be placed on furniture (such as a bed table, a table, or a chair, etc.) that is far away from the socket. However, the electronic device is then far away from the socket and is connected with the socket via the plug of the socket and the transmission wire. Because the electronic device is far away from the socket, the transmission wire and the plug can be easily be pulled and disconnect from the socket. The charging process or the data transmission is therefore interrupted. Especially, when the transmission wire or the plug is pulled and dragged violently, the electronic device is also pulled and dragged, and is often subsequently damaged.

SUMMARY OF THE INVENTION

One particular aspect of the present invention is to provide a supporting device of a socket. The supporting device is located around the socket for supporting an electronic device that utilizes a socket to connect with a power source or transmit data via the Internet. The electronic device is protected, and the electronic device continues operating by being connected with a power source or transmitting data via the Internet.

The supporting device of a socket is fitted with a socket. The supporting device includes a panel having a wedged portion that corresponds and is embedded with the socket, and a supporting board located on the front side of the panel. One side of the supporting board is pivoted with the panel via at least one pivoting part.

The supporting board is used for supporting the electronic device so that the electronic device is close to the socket. The electronic device is protected, and the electronic device continues operating, by being connected with a power source or transmitting data via the Internet.

In another embodiment, the supporting device of a socket is fitted with a socket. The supporting device includes a receiving box having an opening on the front side of the receiving box and receiving the socket in the receiving box, and a supporting board located at an opening between a bottom of the receiving box and the socket and sliding forwards and backwards along the opening.

By utilizing the described structure, the supporting board is used for supporting the electronic device so that the electronic device is close to the. socket. The electronic device is protected, and the electronic device continues operating, by being connected with a power source or transmitting data via the Internet.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
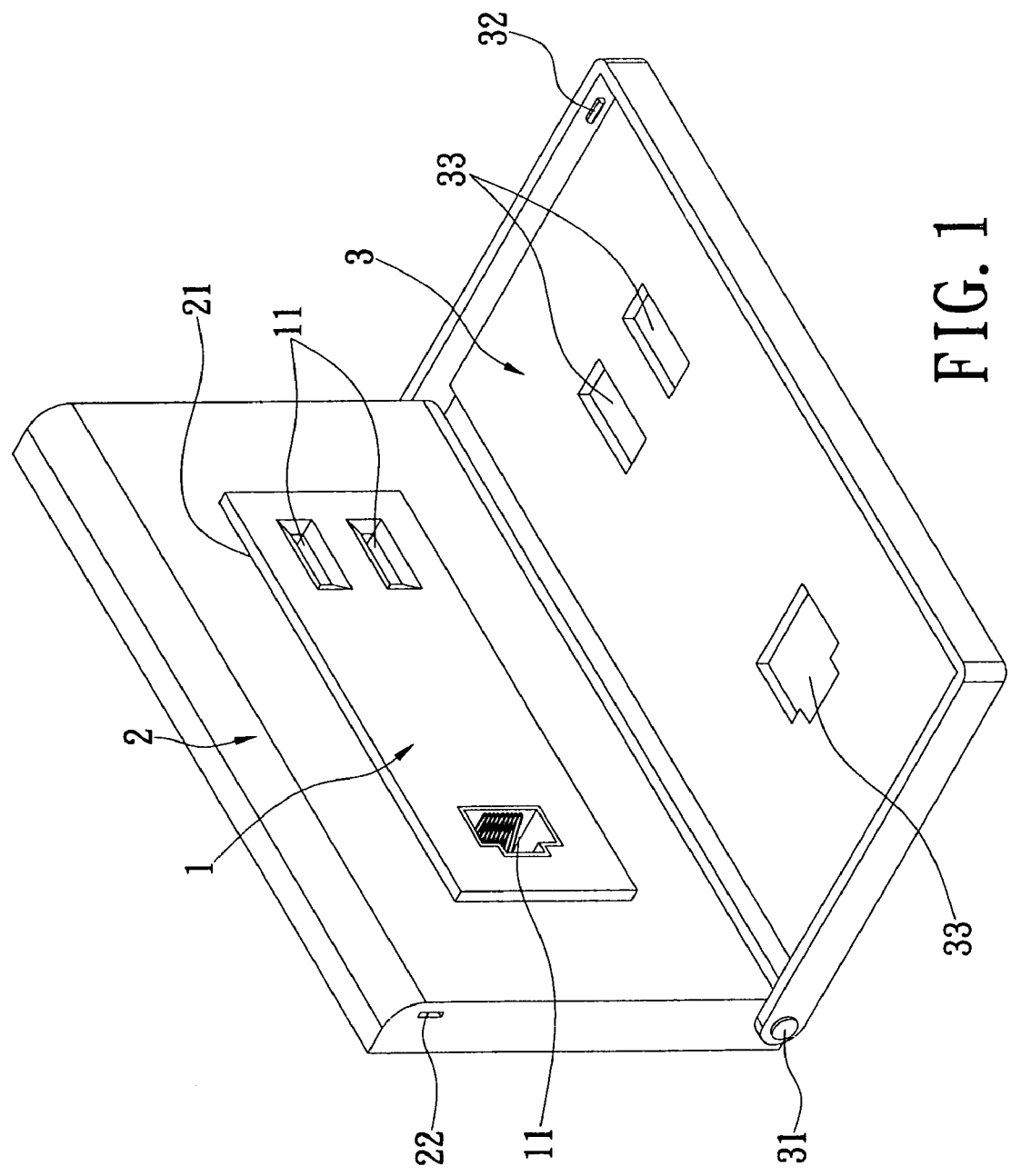
FIG. 1 is a perspective view of the first embodiment of the present invention.
Figure 2:
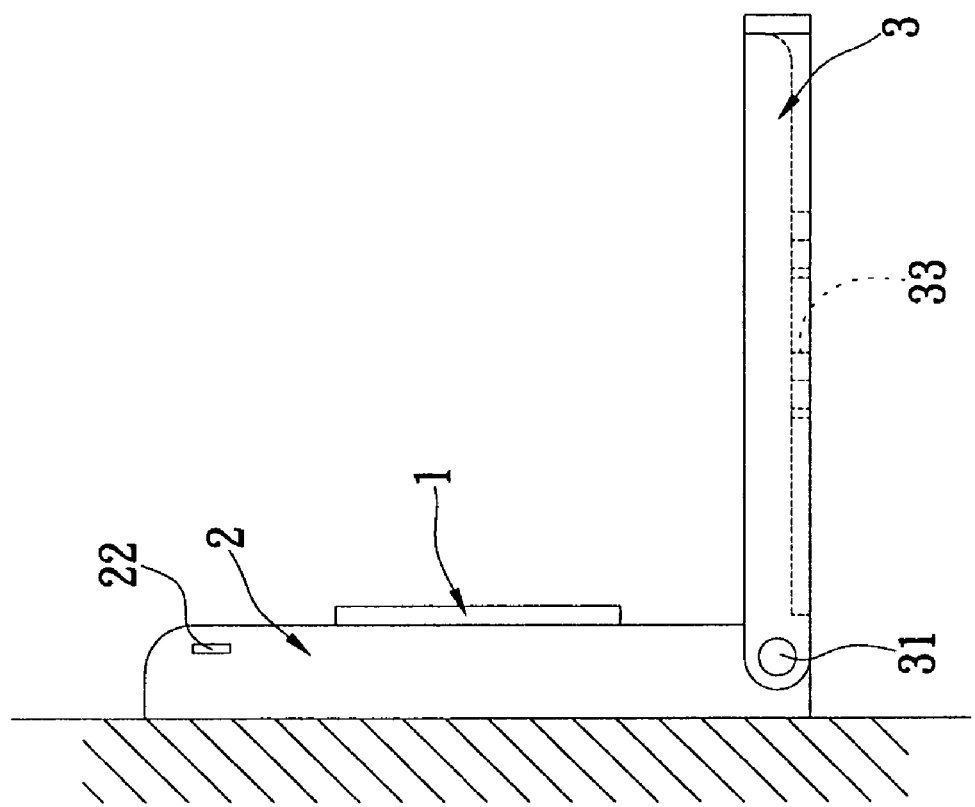
FIG. 2 is a side view of the first embodiment of the present invention.

Reference is made to FIGS. 1 and 2. The supporting device of a socket is fitted with a socket 1. The surface of the socket 1 has two sets of plugging holes 11. The plugging hole 11 is a plugging hole for a power source, the Internet, or a telephone. The supporting device includes a panel 2 and a supporting board 3. The panel 2 has a wedged portion 21 that corresponds and is embedded with the socket 1. Two sides of the panel 2 individually have one wedged slot 22. In this embodiment, the wedged portion is a through hole.

The supporting board 3 is located on the front side of the panel 2. On two sides of the bottom of the supporting board 3, there is a twisted chain 31 pivoted with the bottom of the panel 2. The twisted chain 31 is a pivoting part. On the edges of the two sides of the supporting board 3, there is a fastening part 32 that corresponds to and is fastened with the wedged slot 22 so that the supporting board 3 and the panel 2 are wedged and fastened together. On the supporting board 3, there are two receiving holes 33 that correspond to the plugging holes 11 of the socket 1.

Figure 3:
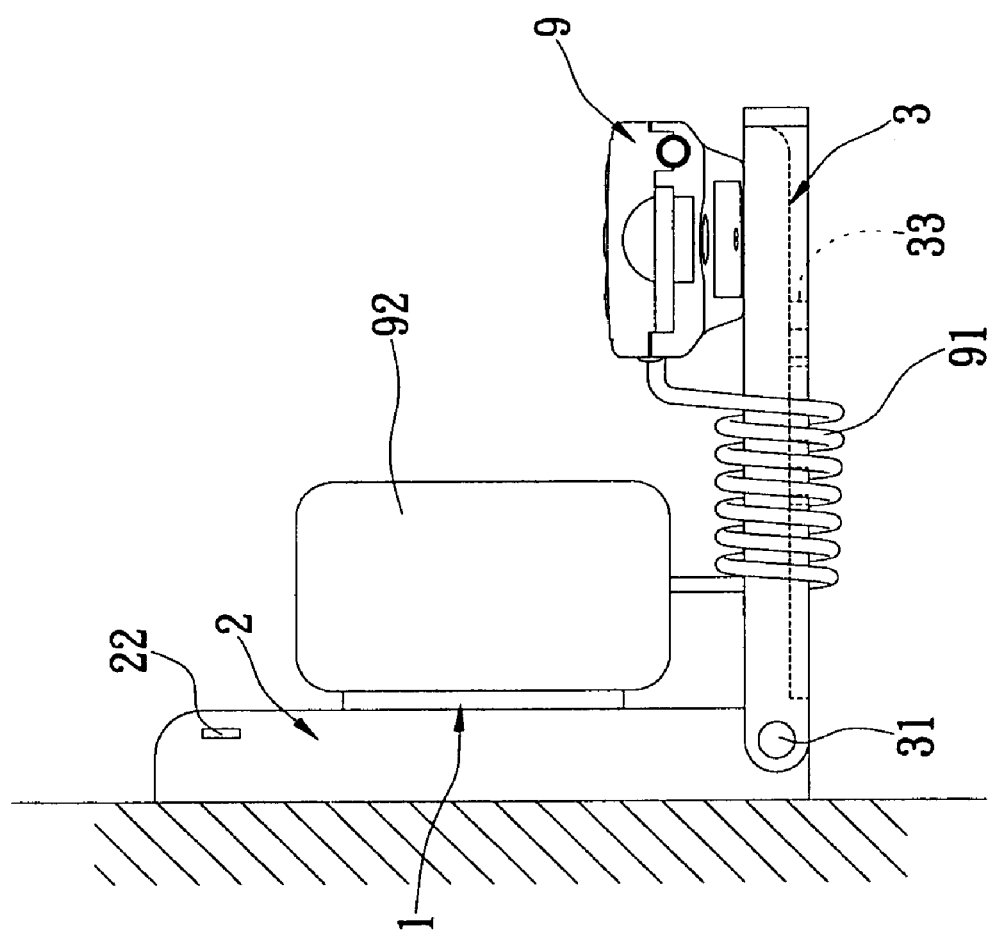
FIG. 3 is a side view of the first embodiment of the present invention connected with an electronic device.

In the first embodiment, as shown in FIGS. 1, 2 and 3, when the user wishes to electrically connect an electronic device 9 (such as a cell phone) with the socket 1, the user firstly releases the supporting board 3 from the panel 2. Next, the user rotates the supporting board 3 so that it is located at a horizontal location. The transmission wire 91 of the electronic device 9 is wrapped around the supporting board 3 and the plug 92 located at the end of the transmission wire 91 is plugged into the plugging hole 11 of the socket 1. Finally, the electronic device 9 is placed on the supporting board 3 so that the electronic device 9 is firmly installed with the socket 1 when the electronic device 9 is connected with a power source or is transmitting data via the Internet.

Figure 4:
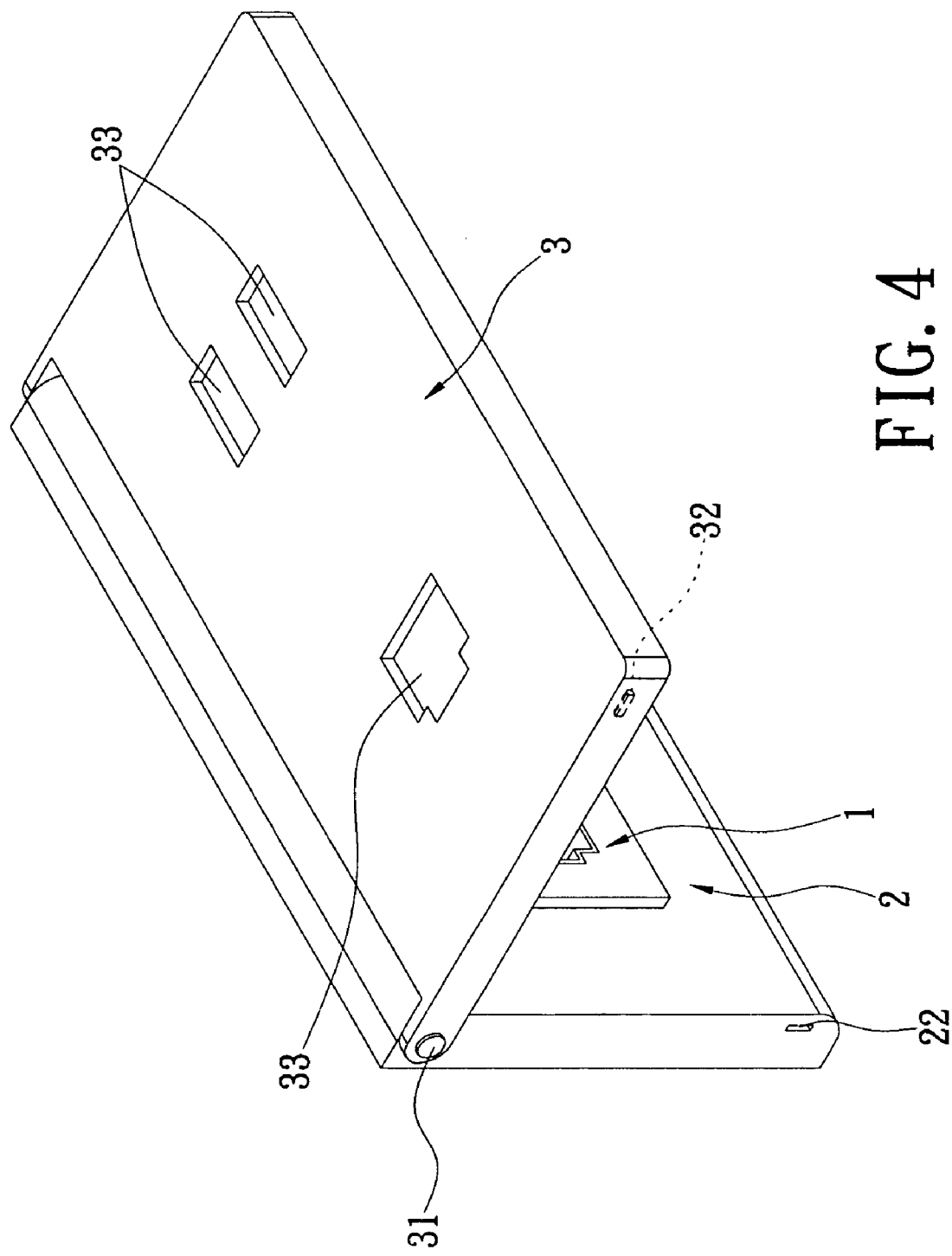
FIG. 4 is another perspective view of the supporting board of the first embodiment of the present invention.

Furthermore, as shown in FIG. 4, on the two sides of the top of the supporting board 3, there is a twisted chain 31 pivoted with the top side of the panel 2 so that supporting board 3 can be rotated upwards to a horizontal location.

Figure 5:
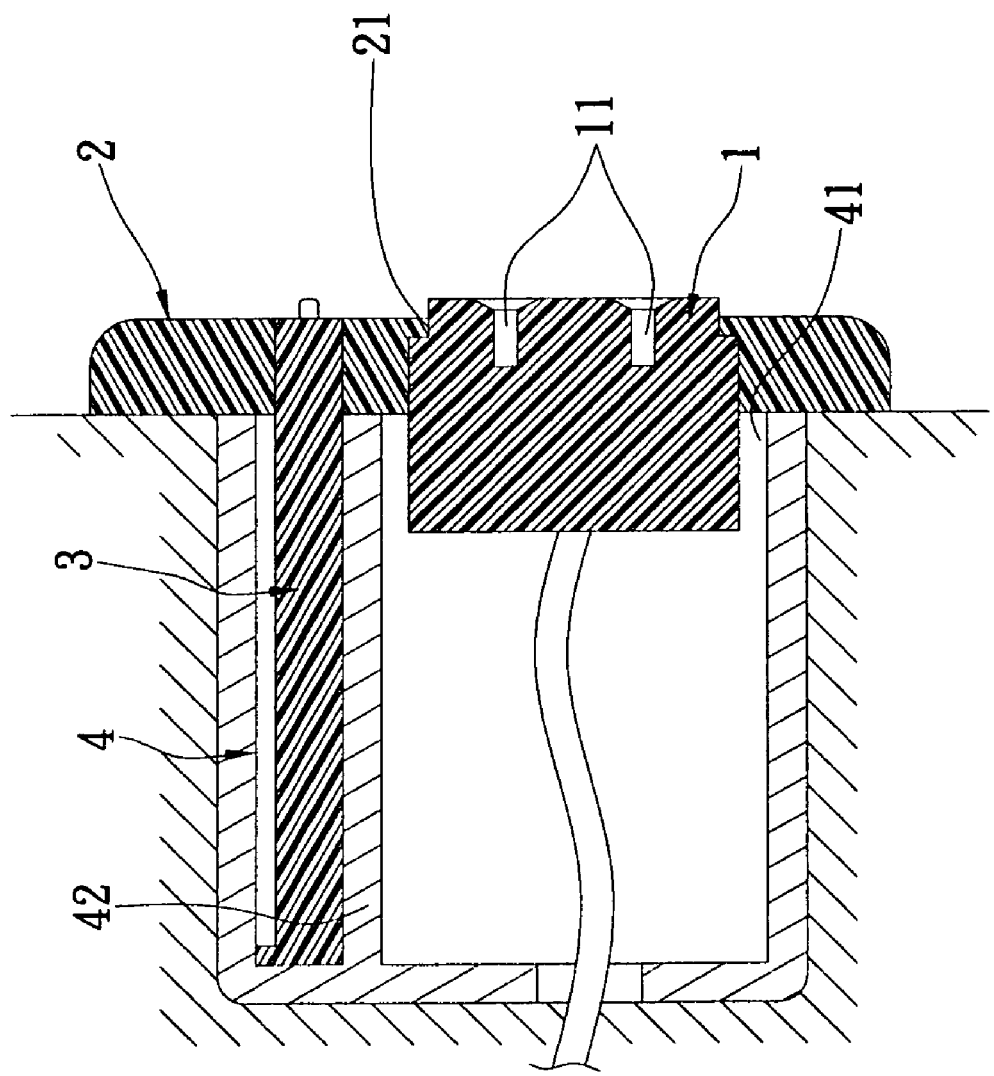
FIG. 5 is a cross-sectional view of the second embodiment of the present invention.

In the second embodiment, as shown in FIG. 5, the supporting device is fitted with a socket 1. The surface of the socket 1 has two sets of plugging holes 11. The supporting device includes a receiving box 4, a panel 2, and a supporting board 3. The receiving box 4 is an enclosed body, and there is an opening 41 located on the front side of the receiving box 4. The socket 1 is received in the receiving box 4. The receiving box 4 has a fastening board 42 that corresponds to the top of the socket 1.

The panel 2 is located at the opening 41 of the receiving box 4. The panel 2 has a wedged portion 21 that corresponds and is embedded with the socket 1.

The supporting board 3 is located at opening 41 between the fastening board 42 of the receiving box 4 and the top of the panel 2, and slides forwards and backwards along the opening 41.

Figure 6:
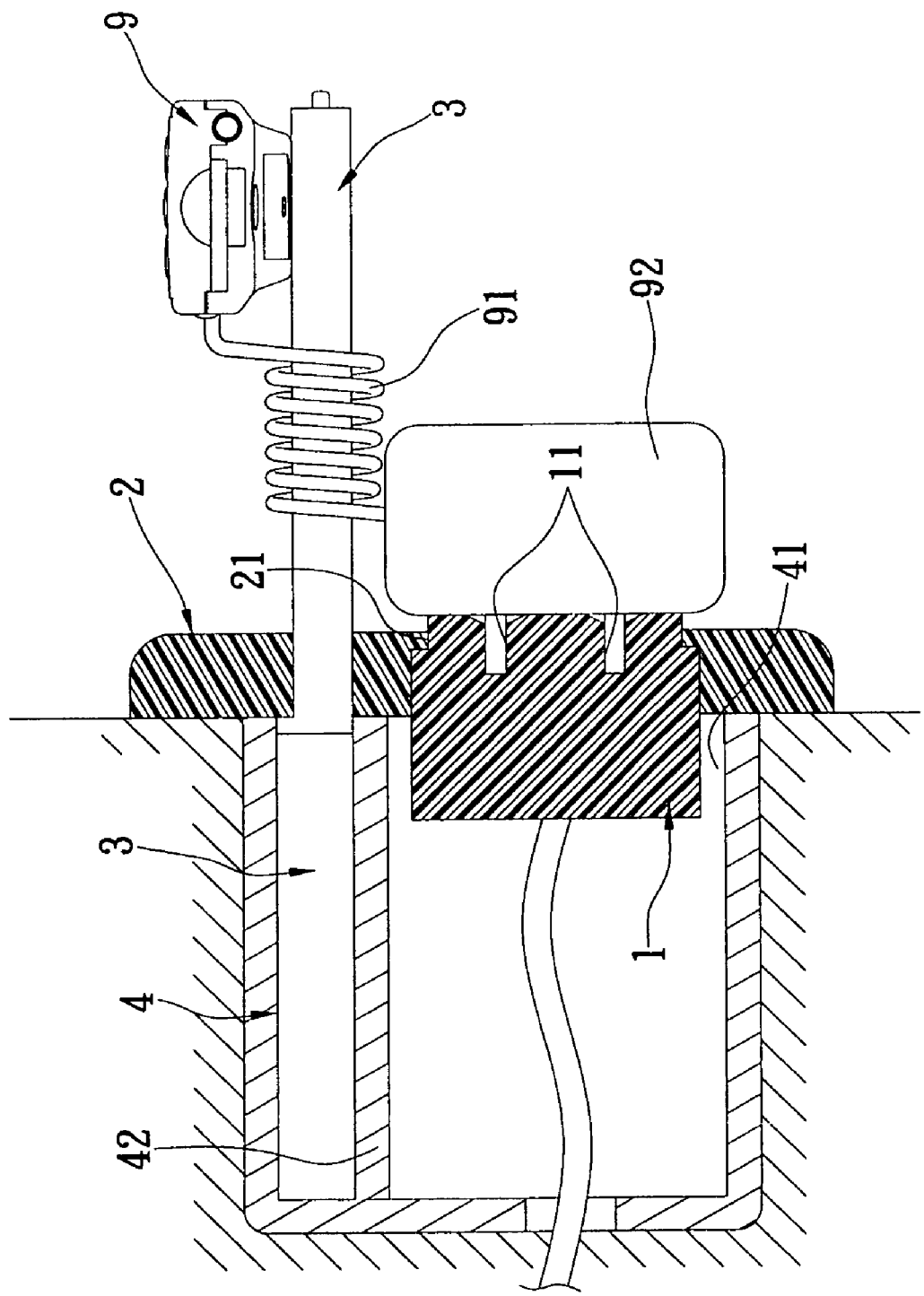
FIG. 6 is a cross-sectional view of the second embodiment of the present invention connected with an electronic device.

In this embodiment, as shown in FIG. 6, firstly, the user pulls the supporting board 3 of the fastening board 42 to an outside of the receiving box 4 along the opening 41. Next, the transmission wire 91 of the electronic device 9 is wrapped around the supporting board 3 and the plug 92 located at the end of the transmission wire 91 is plugged into the plugging hole 11 of the socket 1. Finally, the electronic device 9 is placed on the supporting board 3 so that the electronic device 9 is firmly installed with the socket 1 when the electronic device 9 is connected with a power source or is transmitting data via the Internet.

Figure 7:
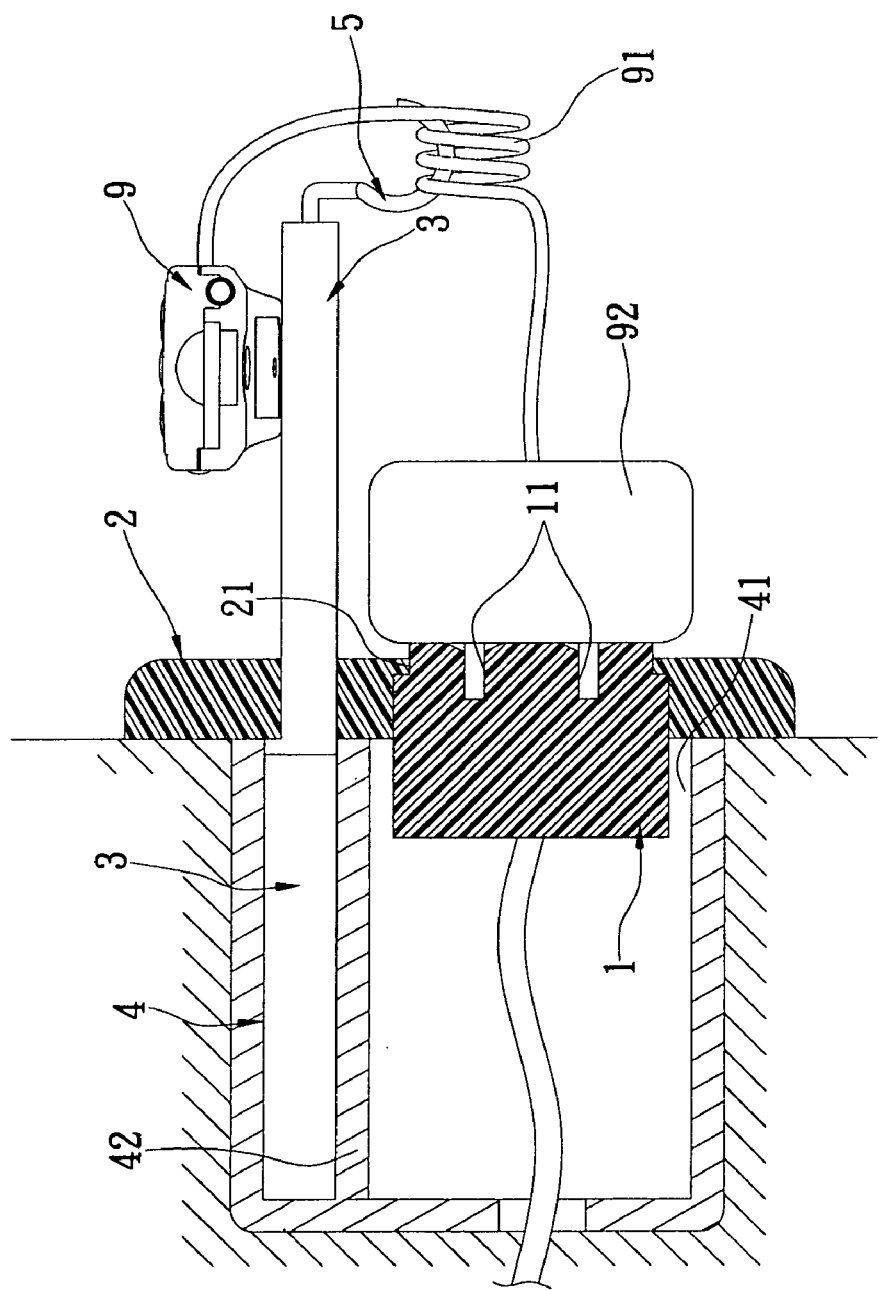
FIG. 7 is a cross-sectional view of the third embodiment of the present invention connected with an electronic device.

In the third embodiment, as shown in FIG. 7, on the two sides of the front side of the supporting board 3 there is a hook 5.

When this embodiment is implemented, firstly, the user wraps the transmission wire 91 of the electronic device 9 around the two hooks 5, and the plug 92 located at the end of the transmission wire 91 is plugged into the plugging hole 11 of the socket 1. Next, the electronic device 9 is placed on the supporting board 3 so that the electronic device 9 is firmly installed with the socket 1 when the electronic device 9 is connected with a power source or is transmitting data via the Internet.

Figure 8:
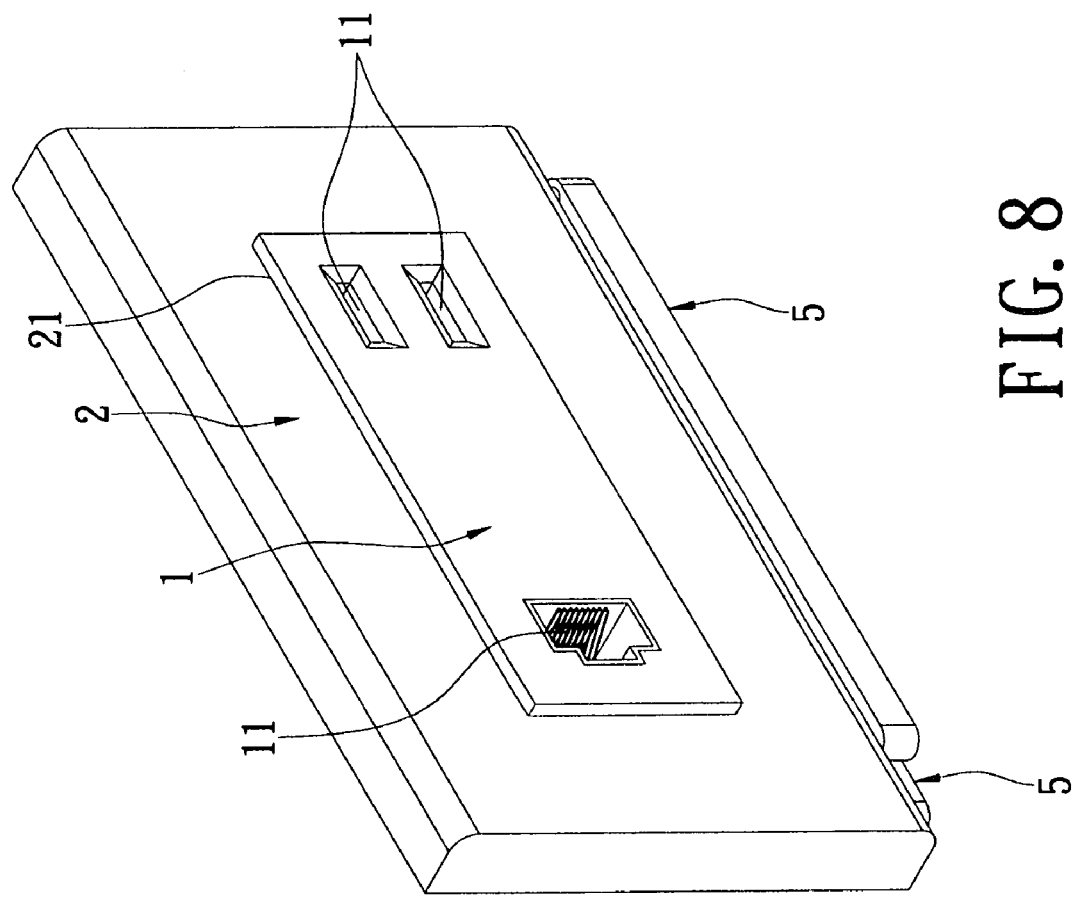
FIG. 8 is a perspective view of the fourth embodiment of the present invention that is received.
Figure 9:
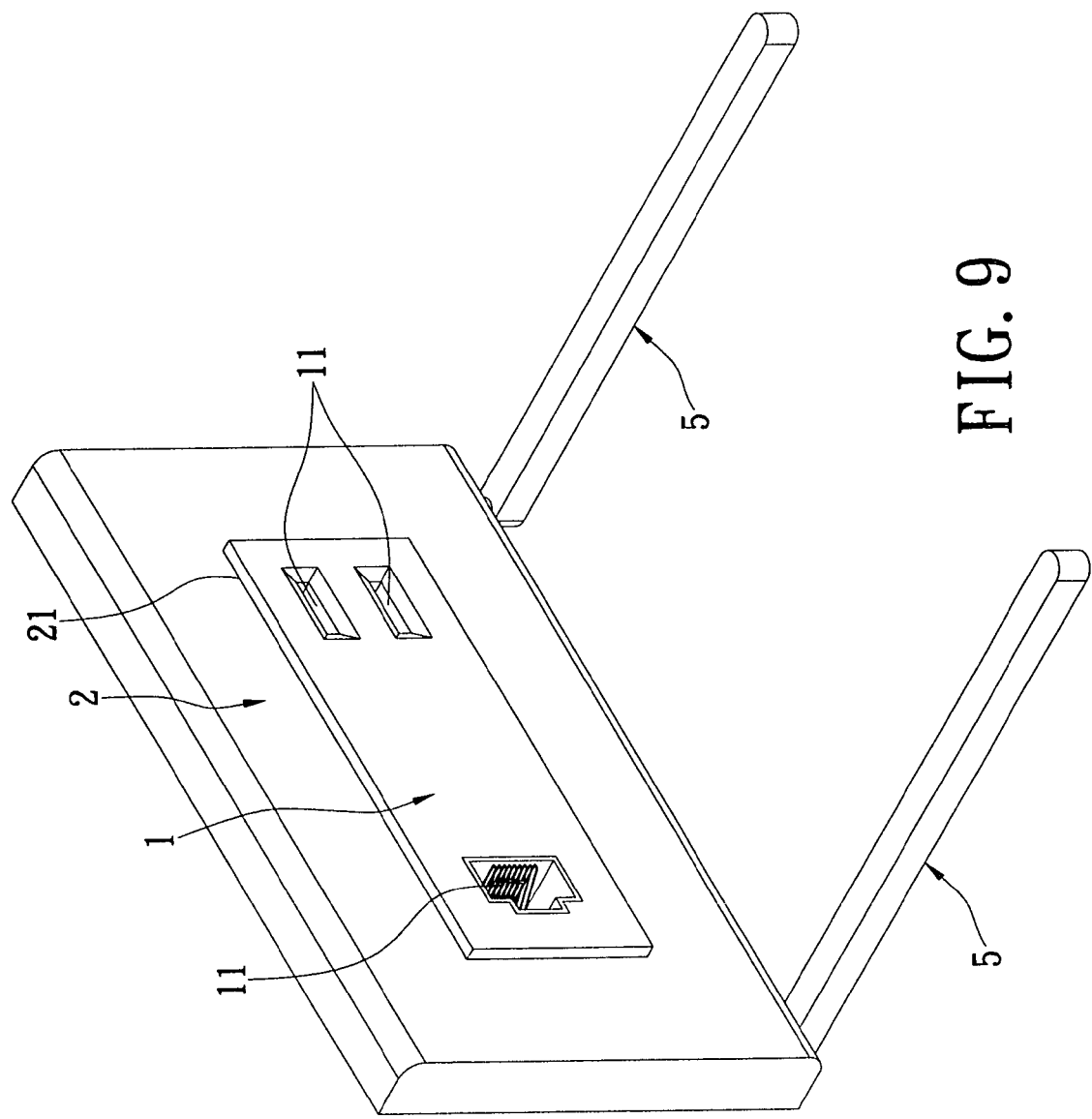
FIG. 9 is a perspective view of the fourth embodiment of the present invention that is opened.

In the fourth embodiment, as shown in FIGS. 8 and 9, the supporting device is fitted with a socket 1. The surface of the socket 1 has two sets of plugging holes 11. The supporting device includes a panel 2. The panel has a wedged portion 21 that corresponds and is embedded with the socket 1. Near to two sides of the bottom of the panel 2 a hook 5 that extends forwards is pivoted, and the two hooks 5 are rotatably received in the bottom of the panel 2.

Figure 10:
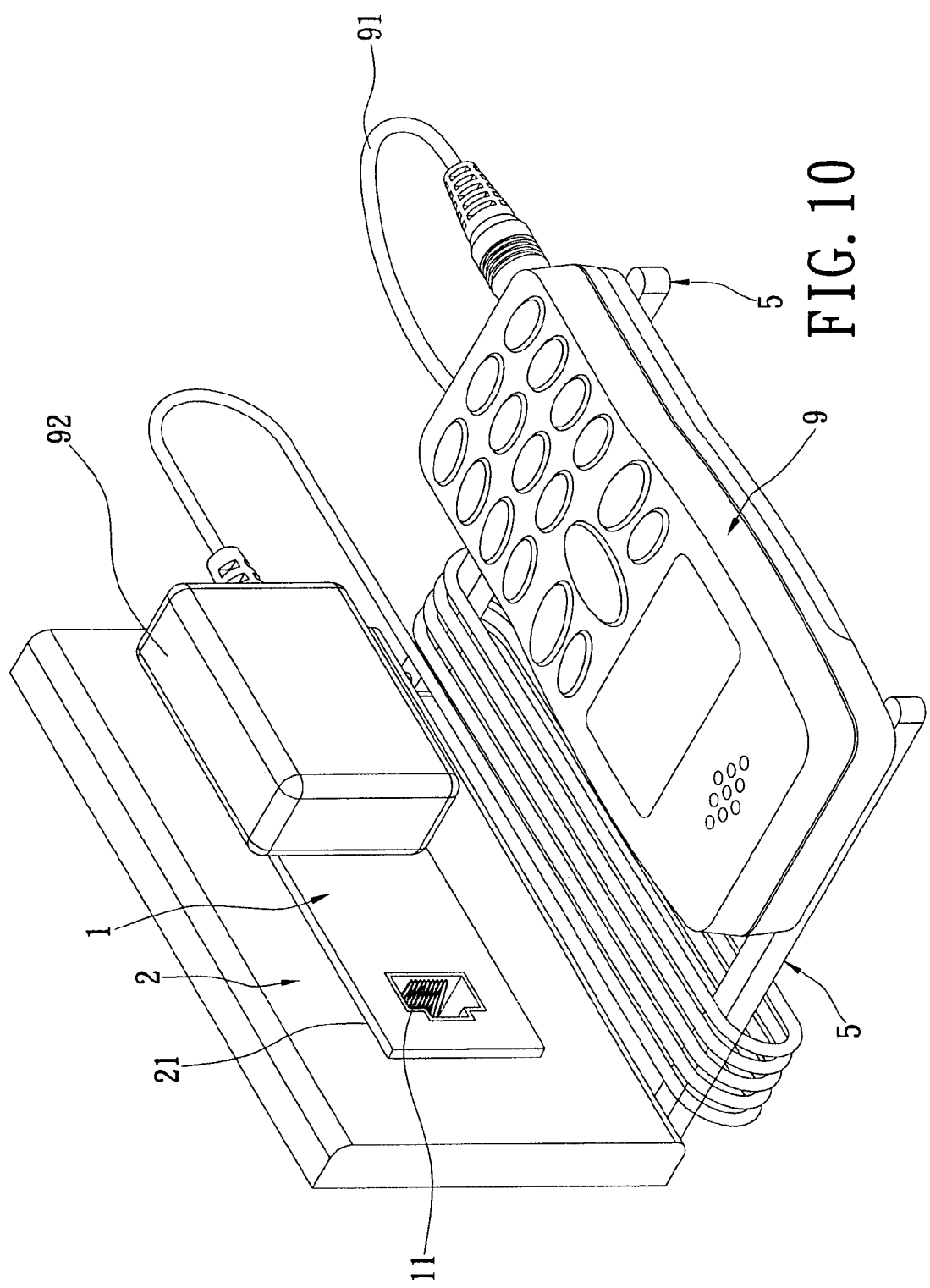
FIG. 10 is a perspective view of the third embodiment of the present invention connected with an electronic device.

When this embodiment is implemented, as shown in FIGS. 8, 9, and 10, firstly, the user forwards rotates the two hooks 5 that are relative to the panel 2 to make the two hooks 5 be located in a horizontal location. Next, the user wraps the transmission wire 91 of the electronic device 9 around the two hooks and plugs the plug 92 located at the end of the transmission wire 91 into the plugging hole 11 of the socket 1. Finally, the electronic device 9 is placed on the two hooks 5 so that the electronic device 9 is firmly installed with the socket 1 when the electronic device 9 is connected with a power source or is transmitting data via the Internet.

Figure 11:
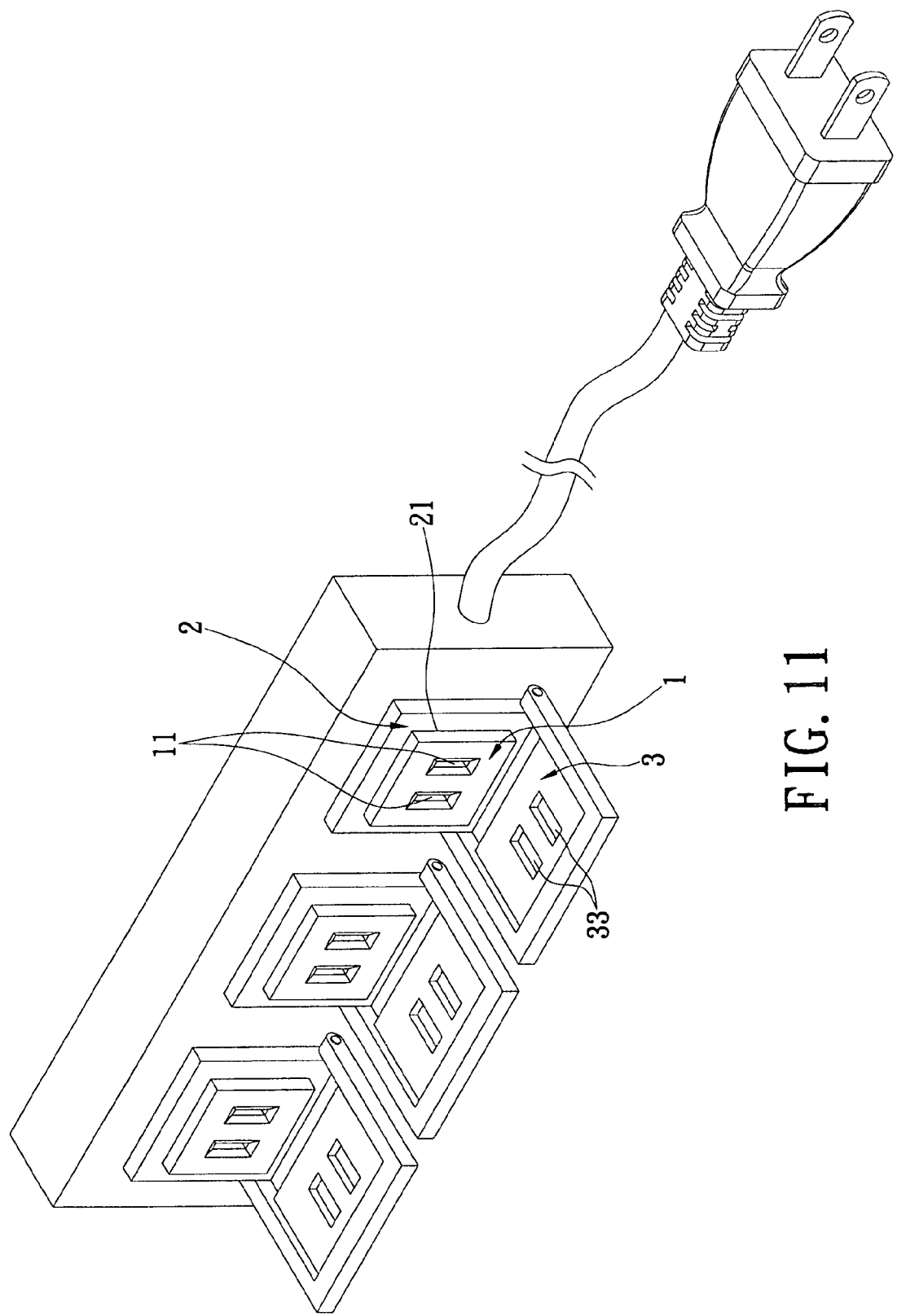
FIG. 11 is a perspective view of the fifth embodiment of the present invention.

In the fifth embodiment, as shown in FIG. 11, the difference between the fifth embodiment and the fourth embodiment is the quantity of sockets is greater than one and is applied to a socket having an extending wire. Each socket 1 is embedded with a panel 2, and the supporting board 3 is pivoted with the bottom of the front side of the panel 2.

Figure 12:
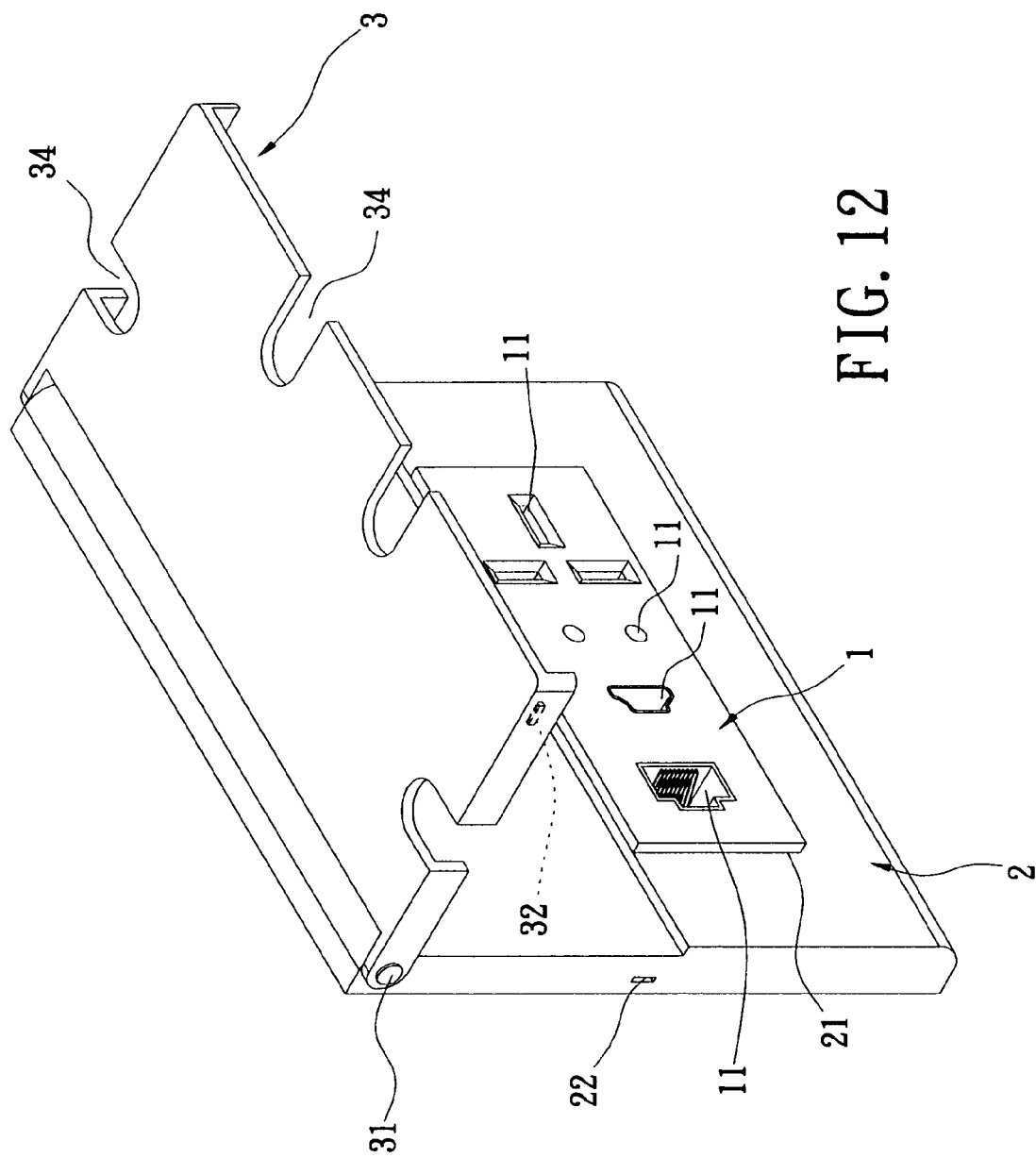
FIG. 12 is a perspective view of the sixth embodiment of the present invention.

In the sixth embodiment, as shown in FIG. 12, the supporting board 3 has an opening slot 34. The opening slot 34 can be hanged with the plug to receive the plug. Therefore, the problems of the plug becoming entangled with other wires or lost are solved.

Figure 13:
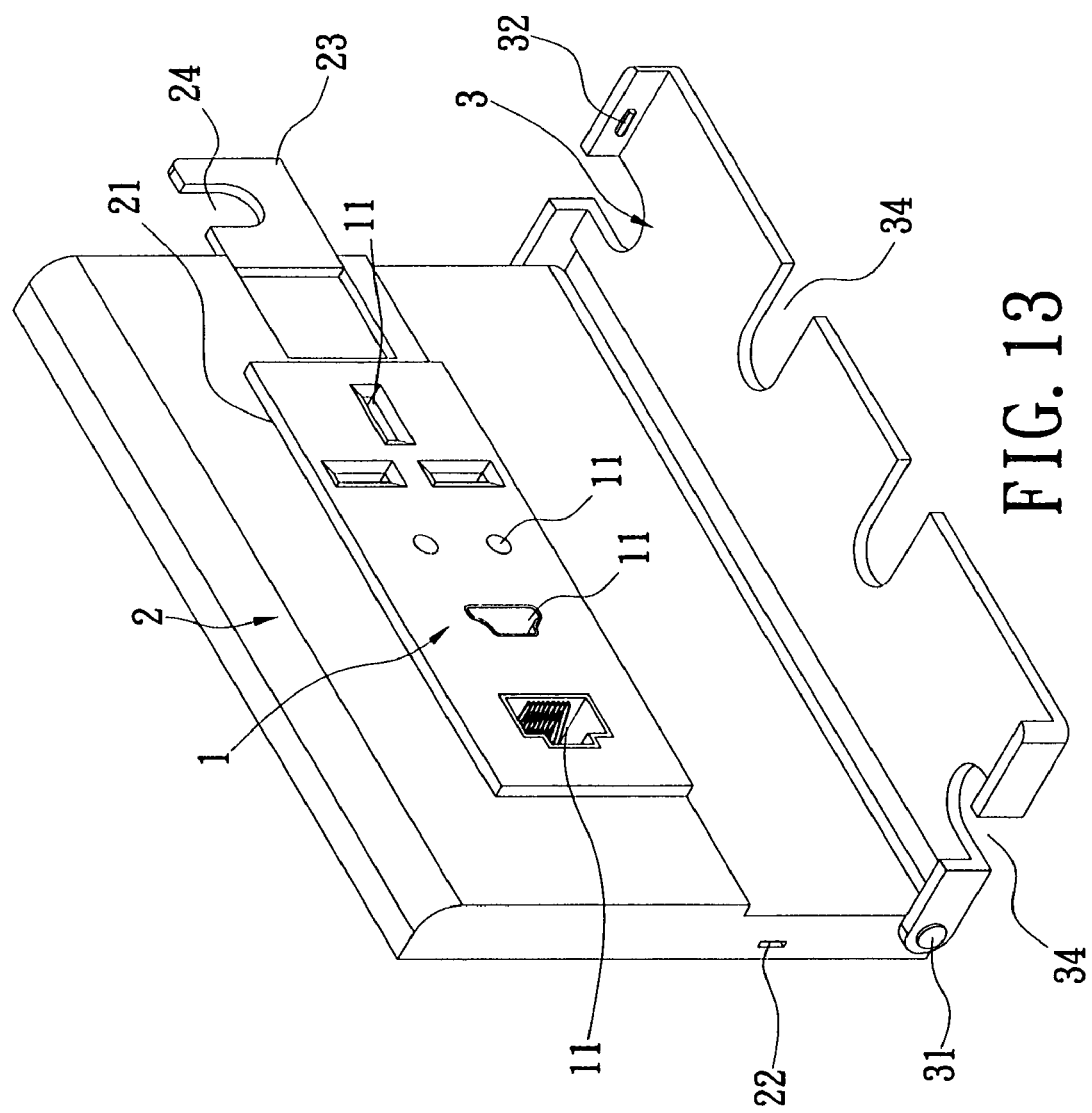
FIG. 13 is a perspective view of the seventh embodiment of the present invention.

In the seventh embodiment, as shown in FIG. 13, one side of the panel 2 is pivoted with a placing base 23. The placing base 23 has at least one opening slot 24. The opening slot 24 can be hanged with the plug to receive the plug. Therefore, the problems of the plug becoming entangled with other wires or lost are solved. Furthermore, a plurality sets of plugging holes 11 are added. The plugging holes 11 can be any connector or power plugging hole.

The present invention has the following characteristics:

1. The present invention places the electronic device 9 on the supporting board 3 or the hook 5 around the socket. Thereby, the electronic device 9 is firmly installed with the socket 1 when the electronic device 9 is connected with a power source or is transmitting data via the Internet. The problem of the electronic device being damaged due to a person walking past the socket 1 and stepping on or crushing the electronic device 9 is overcome.

2. The transmission wire 91 of the electronic device 9 is wrapped around the supporting board 3 or the hook 5, and the electronic device 9 is placed on the supporting board 3 or the hook 5 located around the socket 1. Thereby, the distance between the electronic device 9 and the socket 1 is as short as possible. The transmission wire 91 and the plug 92 will not be pulled and dragged. The plug 92 is electrically connected with the socket 1 well.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A supporting device of a socket, fitted with a socket, comprising:
   a receiving box having an opening on a front side of the receiving box and receiving the socket in the receiving box; and
   a supporting board located at the opening between the receiving box and the socket, and sliding forwards and backwards along the opening;
   wherein the opening of the receiving box is enclosed with a panel, and the panel has a corresponding wedged portion that is embedded with the socket.

2. A supporting device of a socket, fitted with a socket, comprising:
   a receiving box having an opening on a front side of the receiving box and receiving the socket in the receiving box; and
   a supporting board located at the opening between the receiving box and the socket, and sliding forwards and backwards along the opening;
   wherein the receiving box that corresponds to a top of the socket has a fastening board, and the supporting board is located on the fastening board of the receiving box and slides forwards and backwards along the opening.

\* \* \* \* \*